(12) United States Patent
Kuriyagawa et al.

(10) Patent No.: US 10,813,285 B2
(45) Date of Patent: Oct. 27, 2020

(54) LAWN MOWER (71) Applicant: HONDA MOTOR CO., LTD., Tokyo (JP)

(72) Inventors: Koji Kuriyagawa, Wako (JP); Hajime Yoshimura, Wako (JP); Tomoki Ito, Wako (JP); Hideaki Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 378 days.

(21) Appl. No.: 15/852,966

(22) Filed: Dec. 22, 2017

(65) Prior Publication Data

US 2018/0177124 A1 Jun. 28, 2018

(30) Foreign Application Priority Data

Dec. 27, 2016 (JP) .................................. 2016-253959

(51) Int. Cl.
| | | |
|---|---|---|
| *A01D 61/00* | (2006.01) | |
| *A01D 34/73* | (2006.01) | |
| *A01D 34/82* | (2006.01) | |
| *A01D 43/063* | (2006.01) | |
| *A01D 34/69* | (2006.01) | |
| *A01D 101/00* | (2006.01) | |

(52) U.S. Cl.
CPC ........... *A01D 34/73* (2013.01); *A01D 34/826* (2013.01); *A01D 34/69* (2013.01); *A01D 43/063* (2013.01); *A01D 2101/00* (2013.01)

(58) Field of Classification Search
USPC ................ 56/16.6, 17.5, 255, 295, DIG. 19, 56/DIG. 20
See application file for complete search history.

(56) References Cited

U.S. PATENT DOCUMENTS

| | | | | | |
|---|---|---|---|---|---|
| 3,184,903 | A | * | 5/1965 | Fjelstad ................. | A01D 42/02 56/17.5 |
| 3,243,944 | A | * | 4/1966 | Dennis ................. | A01D 34/733 56/295 |
| 3,389,541 | A | * | 6/1968 | Freedlan ................ | A01D 34/73 56/295 |
| 3,452,524 | A | * | 7/1969 | Guetterman .......... | A01D 34/63 56/295 |
| 3,742,688 | A | * | 7/1973 | Tonjes, Jr. ............. | A01D 43/02 56/193 |
| 4,149,358 | A | * | 4/1979 | Comer ................... | A01D 34/71 56/13.4 |
| 4,258,536 | A | * | 3/1981 | Kidd ..................... | A01D 34/733 56/17.5 |
| 4,306,407 | A | * | 12/1981 | Dambroth ............ | A01B 63/108 172/21 |
| 4,715,173 | A | * | 12/1987 | Anderson ............ | A01D 34/733 56/229 |

(Continued)

*Primary Examiner* — Thomas B Will
*Assistant Examiner* — Mai T Nguyen
(74) *Attorney, Agent, or Firm* — Rankin, Hill & Clark LLP (57) ABSTRACT

A cutter blade of a lawn mower includes a blade body and flaps. The blade body includes a shape with a sweepback angle inclined in a reverse-rotation direction of the cutter blade. The flap pivotal axis is provided along a blade edge without intersecting with a blade rotational axis. A flap pivotal axis is provided at a position offset from a line perpendicular to the blade rotational axis and in parallel to the pivotal axis, in a rotation direction of the cutter blade.

4 Claims, 6 Drawing Sheets

(56) References Cited

U.S. PATENT DOCUMENTS

| | | | |
|---|---|---|---|
| 6,655,119 B2 * | 12/2003 | Hasei | A01D 34/73 56/255 |
| 7,275,355 B2 | 10/2007 | Adams et al. | |
| 2002/0152736 A1 * | 10/2002 | Hasei | A01D 34/73 56/295 |
| 2003/0074874 A1 * | 4/2003 | Schaedler | A01D 34/73 56/255 |
| 2015/0271998 A1 * | 10/2015 | Kurioka | A01D 34/68 56/255 |

\* cited by examiner

LAWN MOWER

CROSS-REFERENCE TO RELATED APPLICATION

This application is based upon and claims the benefit of priority from Japanese Patent Application No. 2016-253959 filed on Dec. 27, 2016, the contents of which are incorporated herein by reference.

BACKGROUND OF THE INVENTION

Field of the Invention

The present invention relates to a lawn mower including a cutter blade having a changeable flap angle.

Description of the Related Art

The rotary lawn mower cuts (clips) lawn grass by rotating a cutter blade accommodated in a housing having an opened bottom, along lawn grass to cut the lawn grass. Such a lawn mower is, for example, disclosed in the specification of U.S. Pat. No. 7,275,355. According the specification of U.S. Pat. No. 7,275,355, the lawn grass (grass clippings) cut by a cutter blade is swirled, and lifted upward by an air lift unit in a housing, and then, stored in a grass clippings container.

SUMMARY OF THE INVENTION

In this regard, in order to efficiently generate transportation wind (swirl wind) for swirling grass clippings in the housing, and transporting the grass clippings into the grass clippings container, it may be considered to provide a flap having a changeable flap angle about a pivotal axis perpendicular to a blade rotation shaft, for the cutter blade. In this case, for the purpose of generating the transportation wind efficiently, it is desirable to provide the flap pivotal axis in substantially parallel to a blade edge of the cutter blade.

Further, in order to reduce the air resistance during rotation of the cutter blade, in a known approach, the cutter blade has a sweepback angle (shape inclined in a reverse-rotation direction, from the radiation direction around the blade rotational axis). However, if the cutter blade having the flap simply has a sweepback angle, the flap pivotal axis is provided at a position shifted toward the rear end of the blade in the rotation direction. In this case, if the flap is configured to have a sufficient area so as not to lower the capability of producing the transportation wind, the width of the blade in the circumferential direction where the flap is provided becomes large. Therefore, the cutter blade has a large size.

The present invention has been made taking such a problem into account, and an object of the present invention is to provide a lawn mower in which it is possible to prevent the increase in the size of a cutter blade, and produce transportation wind efficiently.

In order to achieve the above object, a lawn mower includes a cutter blade including a blade body and a flap, and a flap drive mechanism. The blade body extends in a direction perpendicular to a blade rotational axis and includes a blade edge in a front edge in a rotation direction. The flap has a changeable flap angle, and is attached to the blade body. The flap drive mechanism is configured to drive the flap. The blade body has a shape with a sweepback angle inclined in a reverse-rotation direction of the cutter blade with respect to a radiation direction around the blade rotational axis. The pivotal axis of the flap is provided along the blade edge without intersecting with the blade rotational axis. The pivotal axis is provided at a position offset from a line perpendicular to the blade rotational axis and in parallel to the pivotal axis, in a rotation direction of the cutter blade.

In the lawn mower of the present invention having the above structure, the pivotal axis of the flap does not intersect with the blade rotational axis, and the pivotal axis of the flap is provided at a position offset from the line which is perpendicular to the blade rotational axis and in parallel to the flap pivotal axis, in a rotation direction of the cutter blade. Therefore, in comparison with the structure where the flap pivotal axis is perpendicular to the blade rotational axis, it is possible to place the pivotal axis of the flap at a position closer to the front edge of the blade. Thus, it becomes possible to prevent the increase in the size of the cutter blade, and produce the transportation wind efficiently.

The flap drive mechanism may include a flexible shaft provided along the blade body, and configured to transmit a driving force for operating the flap, to the flap.

In the structure, it is possible to realize the structure for transmitting the driving force to the flap including the pivotal axis which does not intersect with the blade rotational axis.

An expansion may be provided for the blade body, over an area extending in a radial direction of the cutter blade, the expansion expanding in a thickness direction of the cutter blade, a recess may be provided on a surface of the blade body opposite to a surface where the expansion is provided, the recess forming a back surface of the expansion, and the flexible shaft may be provided in the recess.

In the structure, since the expansion is provided, it is possible to improve the rigidity of the blade body, and since the flexible shaft is provided in the recess, it becomes possible to reduce the air resistance during rotation of the cutter blade.

The blade body may include an inner blade forming part adjacent to a blade central part and an outer blade forming part provided outside the inner blade forming part in a radial direction, and the flap may be attached to the outer blade forming part. The outer blade forming part may be positioned below the inner blade forming part. One end of the flexible shaft may be provided in the inner blade forming part, and another end of the flexible shaft is provided in the outer blade forming part.

Accordingly, also in the case adopting the blade body where the outer blade forming part is positioned below the inner blade forming part, with the simple structure, it is possible to efficiently transmit the rotational driving force for changing the flap angle, to the flap.

In the lawn mower of the present invention, it is possible to prevent the increase in the size of the cutter blade, and produce the transportation wind efficiently.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a lawn mower according to the present invention will be described with reference to the accompanying drawings.

Figure 1:
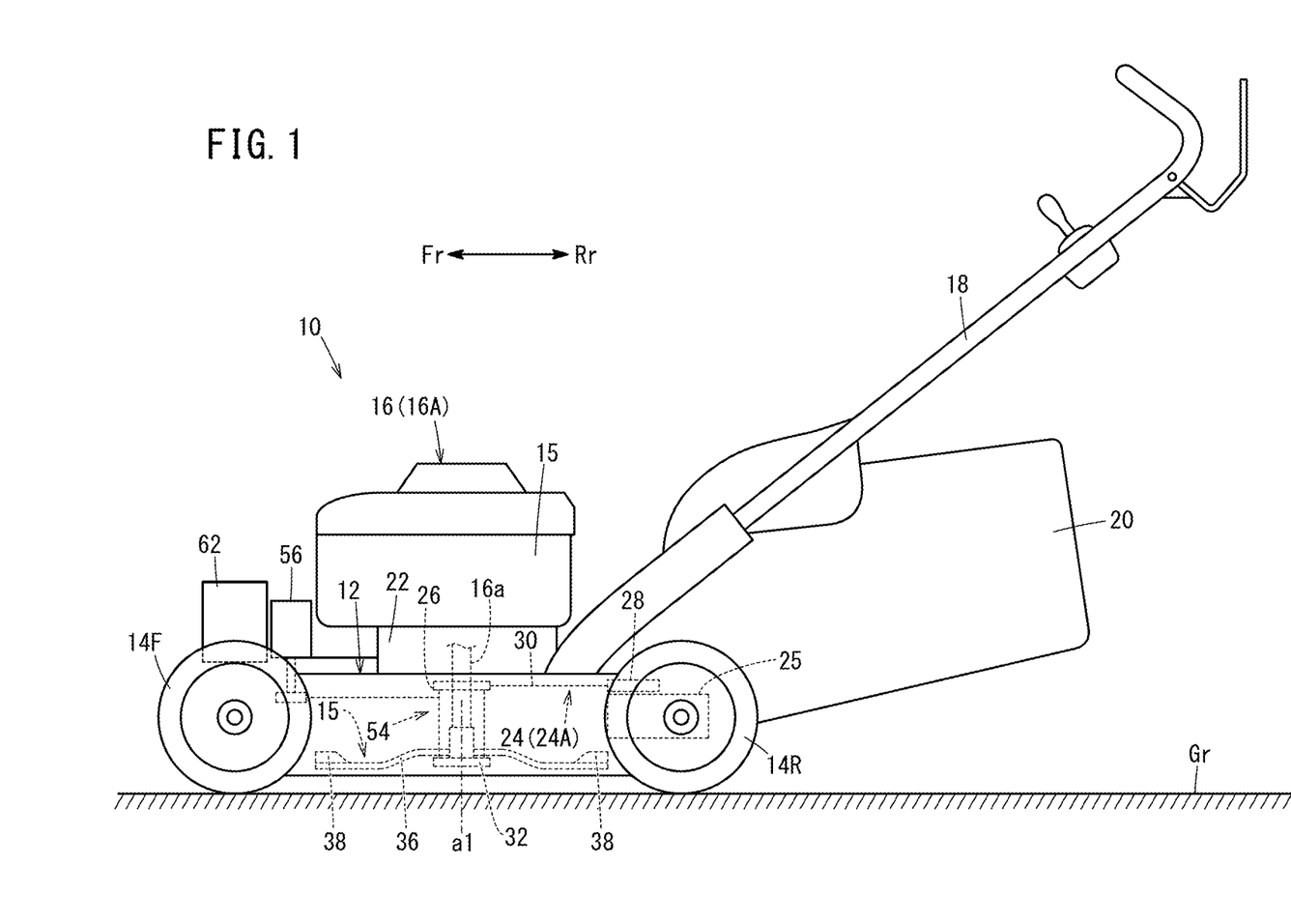
FIG. 1 is a side view showing a lawn mower according to an embodiment of the present invention.
Figure 2:
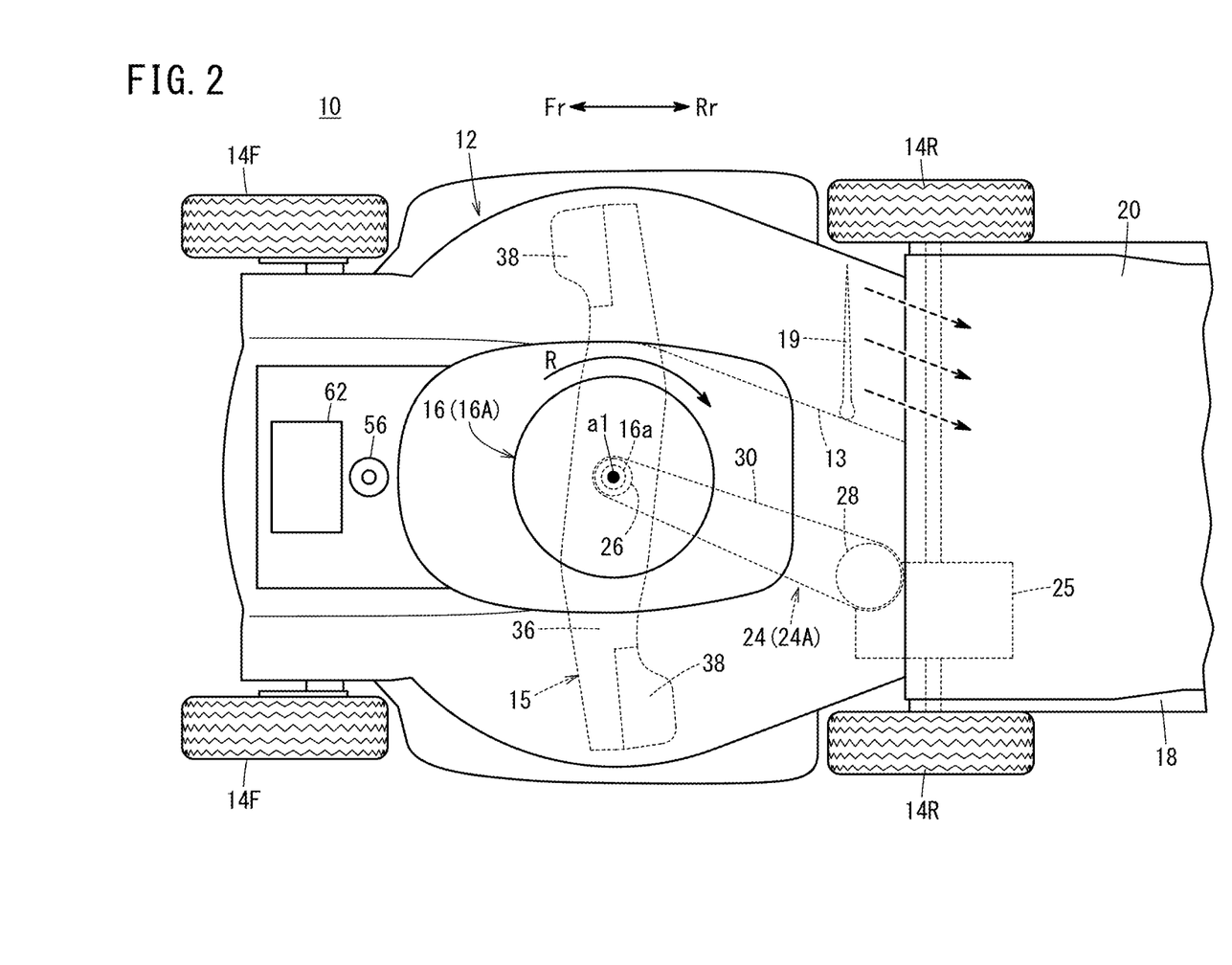
FIG. 2 is a plan view showing the lawn mower.

A lawn mower 10 shown in FIGS. 1 and 2 is a walk-behind, self-propelled working machine for cutting lawn grass. In FIGS. 1 and 2, an arrow Fr denotes the front side (same as the front side as viewed from an operator) of the lawn mower 10, and an arrow Rr denotes the rear side (same as the rear side as viewed from the operator) of the lawn mower 10.

The lawn mower 10 includes a housing 12 as a machine body, left and right front wheels 14F provided on the front side of the housing 12, left and right rear wheels 14R provided on the rear side of the housing 12, a cutter blade 15 accommodated inside the housing 12 for cutting lawn grass, a motor 16 provided above the housing 12, and an operation handle 18 extending backward from the housing 12.

As shown in FIG. 2, in a plan view, the lawn mower 10 rotates the cutter blade 15 clockwise (in the direction indicated by an arrow R) by the motor 16 to cut (clip) the lawn grass under the lawn mower 10. At this time, the lawn mower 10 generates flows of the air (swirl air flow or swirl wind) in the housing 12 swirling in the same direction as the cutter blade 15. By this swirl air flow, the lawn grass cut by the cutter blade 15 can be delivered to, and stored in a grass clippings container 20 through a grass clippings discharge passage 13 formed in the housing 12. Hereinafter, the lawn grass cut (clipped) by the cutter blade 15 will also be referred to as the "grass clippings". Further, the "swirl air flow" will also be referred to as the "transportation wind".

In FIG. 1, the housing 12 is a casing having an opened bottom where only the surface facing the lawn ground Gr under the housing 12 is opened. This housing 12 is in the form of a spiral casing. The housing 12 has a scroll section having a spiral shape in a plan view, for swirling the lawn grass cut by the cutter blade 15 by the swirl wind, and transporting the lawn grass (grass clippings) toward the grass clippings discharge passage 13.

As shown in FIG. 2, a mode switch damper 19 is provided for the grass clippings discharge passage 13. The mode switch damper 19 can be operated by an operation lever (not shown). By controlling the open/closed state of the mode switch damper 19, it is possible to selectively switch the operating mode, between a bagging mode for storing the grass clippings in the grass clippings container 20 and a mulching mode for discharging the grass clippings to a position below the housing 12.

In FIG. 1, a motor base unit 22 is attached to an upper surface of the housing 12. The motor 16 is attached to an upper surface of the motor base unit 22. In the embodiment of the present invention, an engine 16A is mounted as the motor 16. It should be noted that the motor 16 is not limited to the engine 16A. For example, the motor 16 may be an electric motor. The motor 16 has an output shaft 16a. The output shaft 16a protrudes downward, and extends into the housing 12. The output shaft 16a is substantially vertical to the ground Gr. Therefore, in the case where the lawn mower 10 is present on the horizontal ground Gr, the output shaft 16a is rotated about the rotation axis which is substantially perpendicular to the horizontal plane.

The driving force generated by the motor 16 is transmitted to the left and right rear wheels 14R as a traveling driving force, through a traveling power transmission mechanism 24 and a transmission gear 25 coupled to the output shaft 16a. Therefore, the left and right rear wheels 14R are provided as drive wheels. In the embodiment of the present invention, the traveling power transmission mechanism 24 is in the form of a belt mechanism 24A. The belt mechanism 24A includes a drive pulley 26 fixed to the output shaft 16a, a driven pulley 28 coupled to the transmission gear 25, and a drive belt 30 wound around the drive pulley 26 and the driven pulley 28. As the transmission gear 25, for example, a hydraulic continuously variable transmission gear may be used.

The cutter blade 15 is coupled to the output shaft 16a of the motor 16. The rotary driving force is transmitted from the output shaft 16a to the cutter blade 15 for rotating the cutter blade 15. Specifically, the cutter blade 15 is coupled to the output shaft 16a through a blade holder 32 (see also FIG. 5). The blade holder 32 is attached to the center of the cutter blade 15, and coupled to a lower end of the output shaft 16a coaxially with the output shaft 16a. Therefore, in the embodiment of the present invention, the rotational axis a1 (rotation central line) of the cutter blade 15 is in alignment with the rotation axis of the output shaft 16a (the rotational axis a1 of the cutter blade 15 is coaxial with the rotation axis of the output shaft 16a). Hereinafter, the rotational axis a1 of the cutter blade 15 will be referred to as the "blade rotational axis a1".

It should be noted that the blade rotational axis a1 may not be in alignment with the rotation axis of the output shaft 16a. For example, the blade rotational axis a1 may be in parallel to the rotation axis of the output shaft 16a, at a position offset in a direction perpendicular to the rotation axis of the output shaft 16a. Alternatively, the blade rotational axis a1 may not be in parallel to the rotation axis of the output shaft 16a.

Figure 3:
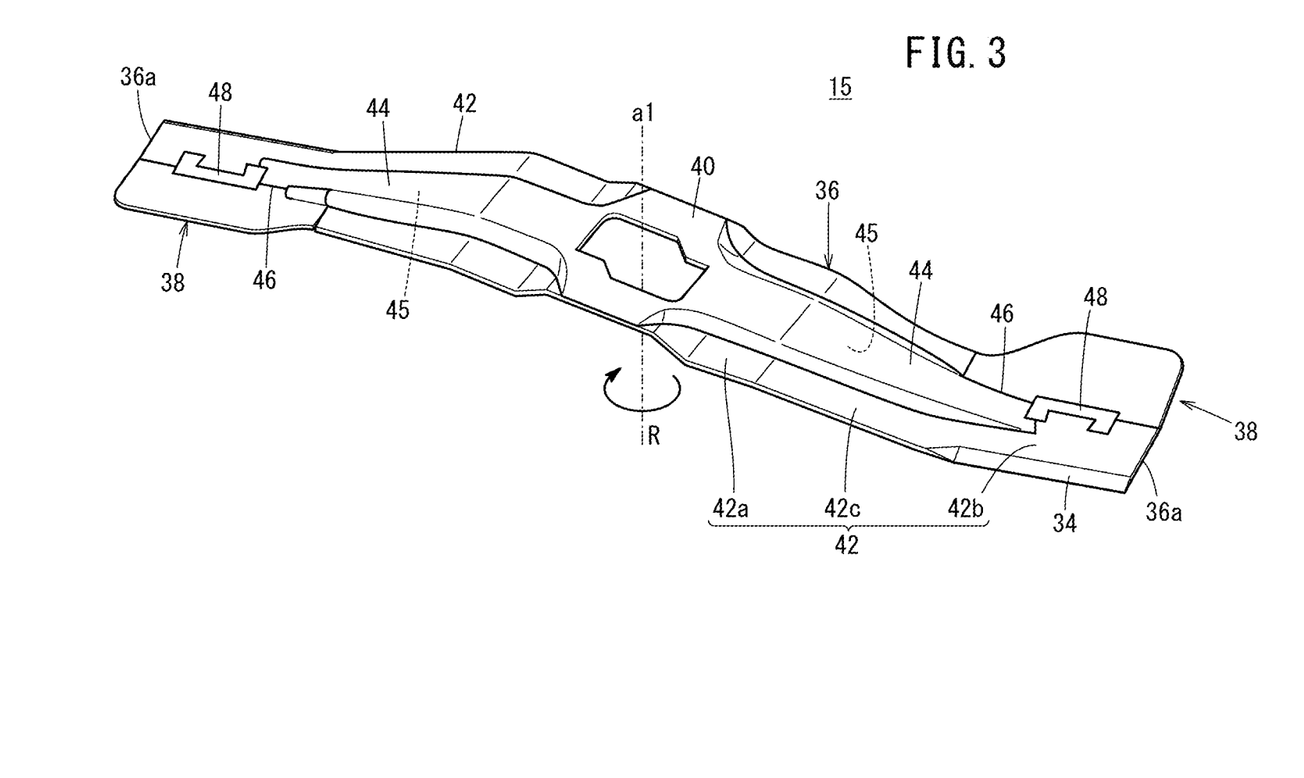
FIG. 3 is a perspective view showing a cutter blade mounted in the lawn mower.
Figure 4:
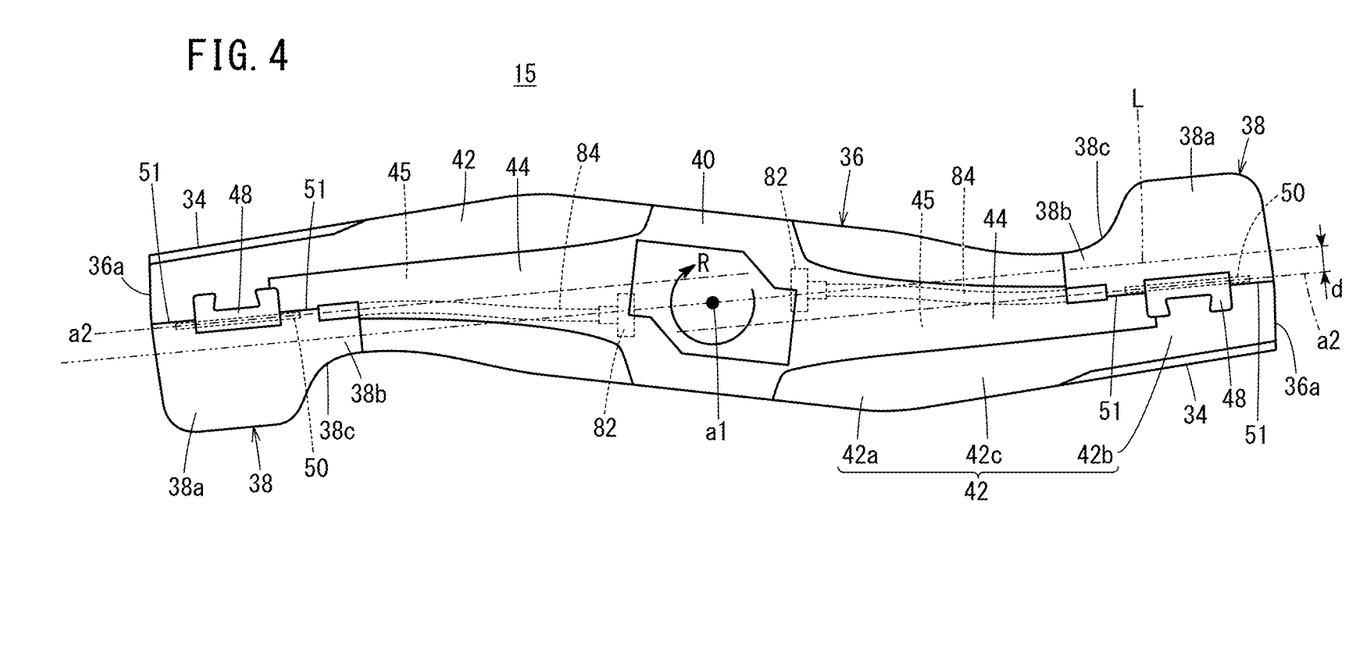
FIG. 4 is a plan view showing the cutter blade.

As shown in FIGS. 3 and 4, the cutter blade 15 includes a blade body 36 and flaps 38. The blade body 36 extends in a direction perpendicular to the blade rotational axis a1, and blade edges 34 are provided at front edges of the cutter blade 15 in a rotation direction. The flaps 38 are attached to the blade body 36, and the flap angles θ (see FIG. 5) of the flaps 38 are changeable.

The blade body 36 is a narrow member in the form of a plate (so called bar blade). Hereinafter, the longitudinal direction of the cutter blade 15 (blade body 36) will also be referred to as the "radial direction". The blade body 36 includes a central proximal part 40 and a pair of blade arms 42 extending oppositely from the central proximal part 40. The pair of the blade arms 42 are symmetrical with each other about the blade rotational axis a1.

Each of the blade arms 42 includes an inner blade forming part 42a forming an inner area of the blade arm 42 in the radial direction, an outer blade forming part 42b (clipping part) forming an outer area of the blade arm 42 in the radial direction, and an intermediate blade forming part 42c forming an area between the inner blade forming part 42a and the outer blade forming part 42b. The inner blade forming part 42a and the outer blade forming part 42b are perpendicular to the blade rotational axis a1. Therefore, the inner blade forming part 42a and the outer blade forming part 42b are in parallel to each other.

In FIG. 3, the intermediate blade forming part 42c is inclined downward toward the outside in the radial direction. Therefore, the outer blade forming part 42b is positioned below the inner blade forming part 42a. It should be noted that each of the blade arms 42 may have a constant height from the inner blade forming part 42a to the outer blade forming part 42b.

In FIG. 4, the blade body 36 has a shape with a sweepback angle inclined in a reverse-rotation direction of the cutter blade 15 (opposite to the direction indicated by an arrow R) with respect to the radiation direction about the blade rotational axis a1. That is, the blade body 36 (pair of blade arms 42) is curved in the reverse-rotation direction of the cutter blade 15, at an intermediate position between the blade rotational axis a1 and an outer end 36a of the blade body 36.

The blade edges 34 are formed along the front edges in the rotation direction, at both ends of the blade body 36. Each of the blade edges 34 is formed in a straight line on a plane surface perpendicular to the blade rotational axis a1. In the embodiment of the present invention, the blade edge 34 is formed over the entire front edge of the outer blade forming part 42b. An inner end of the blade edge 34 in the radial direction is formed at the front edge where the outer blade forming part 42b and the intermediate blade forming part 42c are connected together.

An expansion 44 is formed in the blade body 36. The expansion 44 is formed to extend in the radial direction of the cutter blade 15. The expansion 44 is expanded in the thickness direction (vertical direction) of the cutter blade 15. In FIG. 3, the expansion 44 is expanded upward. The expansion 44 is provided at the intermediate position (center) in the width direction of the blade body 36. The width direction of the blade body 36 herein means a direction perpendicular to the longitudinal direction and the thickness direction of the blade body 36.

The expansion 44 is formed over an area from the inner blade forming part 42a to the outer blade forming part 42b. More specifically, the expansion 44 extends from the inner end of the inner blade forming part 42a to the inner end of the outer blade forming part 42b (portion of the outer blade forming part 42b adjacent to the intermediate blade forming part 42c). The width of the expansion 44 is decreased toward the outer end 36a of the blade body 36 (outward in the radial direction). A recess 45 as the back surface of the expansion 44 is formed in the surface of the blade body 36 opposite to the surface where the expansion 44 is provided (lower surface of the blade body 36, in the embodiment of the present invention).

Flap placement cutouts 46 are formed at the outer ends of the blade body 36. The flaps 38 are provided in the flap placement cutouts 46. The flap placement cutouts 46 are areas formed by cutting the rear edges at the outer ends of the blade body 36 (i.e., positions opposite to the blade edges 34 in the width direction of the blade body 36). The flap placement cutouts 46 extend in the longitudinal direction of the cutter blade 15 in a juxtaposed manner to the blade edge 34.

In the embodiment of the present invention, the flap placement cutout 46 is formed in each of the outer blade forming parts 42b in the pair of blade arms 42. The outer end of the flap placement cutout 46 reaches the outer end 36a of the blade body 36. The flap placement cutout 46 may be positioned at the intermediate position of each of the blade arms 42 in the radial direction. That is, the outer end of the flap placement cutout 46 may be positioned inside the outer end 36a of the blade body 36 in the radial direction.

The flap 38 is a plate member pivotally supported by the blade body 36. A hinge 48 is provided for the outer blade forming part 42b. The hinge 48 protrudes toward the flap placement cutout 46. A hinge pin 50 is inserted into the hinge 48, and both ends of the hinge pin 50 protruding from the hinge 48 are fixed to a pin holder 51 provided at the front edge of the flap 38 (edge facing the outer blade forming part 42b).

In the structure, the flap 38 is pivotable about the pivotal axis a2 extending through the center of the hinge pin 50. Hereinafter, the pivotal axis a2 will be referred to as the "flap pivotal axis a2". The flap pivotal axis a2 is provided on a plane perpendicular to the blade rotational axis a1. The flap 38 can be swung vertically by pivotal operation about the flap pivotal axis a2.

In the embodiment of the present invention, the flap 38 includes a wide part 38a having a relatively large width and a narrow part 38b having a relatively small width formed inside the wide part 38a in the radial direction. Therefore, in the wide part 38a, the flap 38 has a shape protruding in the reverse-rotation direction of the cutter blade 15 (substantially L-shape in a plan view). A back edge 38c contiguous with the wide part 38a and the narrow part 38b has a recessed shape with a smooth curve (arc shape). It should be noted that the flap 38 may have substantially a constant width in the radial direction of the cutter blade 15 (substantially rectangular shape in a plan view).

As shown in FIG. 4, the flap pivotal axis a2 is provided along the blade edge 34. That is, the flap pivotal axis a2 is provided substantially in parallel to the blade edge 34. Further, as viewed in the direction along the blade rotational axis a1, the flap pivotal axis a2 does not intersect with the blade rotational axis a1. The two flap pivotal axes a2 are in parallel to each other, on both sides of the blade rotational axis a1.

The flap pivotal axis a2 is provided at a position offset from a line L which is perpendicular to the blade rotational axis a1 and in parallel to the flap pivotal axis a2, in the rotation direction of the cutter blade 15. The offset distance d (distance between the line L and the flap pivotal axis a2 in the direction perpendicular to the flap pivotal axis a2) is, e.g., in a range of 5 to 15 mm. Alternatively, the ratio of the offset distance d to the diameter of the blade body 36 (entire diameter of the blade body 36) is, e.g., in a range of 1 to 2%.

In FIG. 1, in order to drive the flaps 38 having the above structure, the lawn mower 10 further includes a flap drive mechanism 54. The flap drive mechanism 54 is not limited to have certain structure, and may take various forms. For example, the flap drive mechanism 54 has a flap drive source, and transmits the driving force of the electric motor to the flaps 38 through a driving force transmission mechanism 58 to rotate the flaps 38. For example, a flap drive source 56 is an electric motor. The above motor 16 (engine 16A) may also have the function of the flap drive source. Next, an example of the flap drive mechanism 54 will be described.

Figure 5:
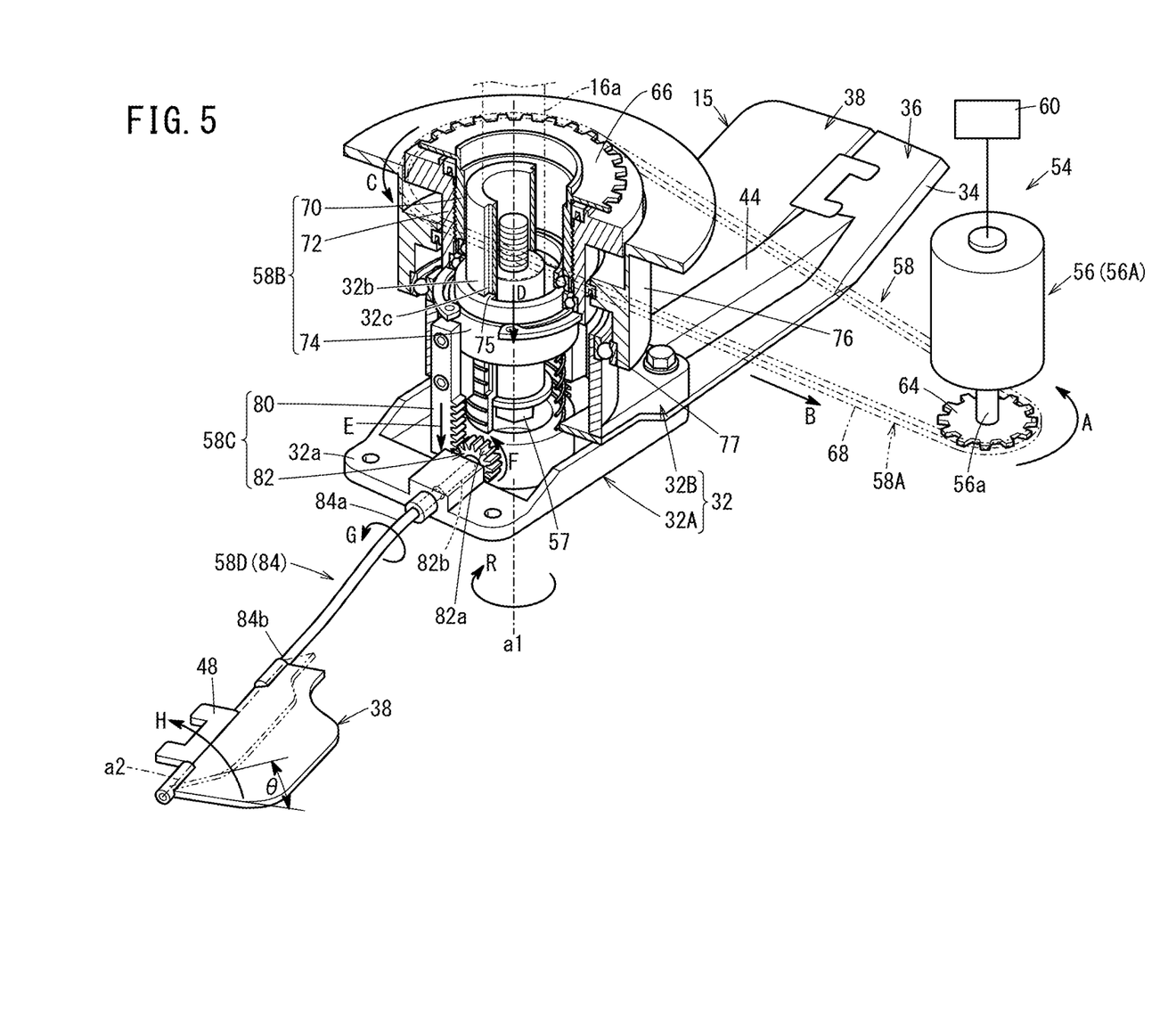
FIG. 5 is a view showing structure of the cutter blade and a flap drive mechanism.

In FIG. 5, the flap drive mechanism 54 includes the flap drive source 56, and the driving force transmission mechanism 58 for transmitting the driving force of the flap drive source 56 to the flaps 38. The output shaft 16a is fixed to the blade holder 32. Specifically, the blade holder 32 includes a first holder member 32A which contacts a lower surface of the blade body 36, and a second holder member 32B which contacts an upper surface of the blade body 36. The blade body 36 is held, and fixed between the first holder member 32A and the second holder member 32B.

The first holder member 32A includes a holder base part 32a supporting a lower surface of the blade body 36, and a hollow support cylinder 32b protruding upward from the central position of the holder base part 32a. The output shaft 16a is coupled to the support cylinder 32b by a bolt 57. Thus, during rotation of the output shaft 16a, the blade holder 32 and the cutter blade 15 rotate together with the output shaft 16a.

In the embodiment of the present invention, the flap drive source 56 is a geared motor 56A. The flap drive source 56 is controlled by a control unit 60. The flap drive source 56 is not limited to the rotary actuator. A liner actuator (linear motor, cylinder, etc.) may be used as the flap drive source 56. Alternatively, the flap drive source 56 may be an engine. The flap drive source 56 may be driven by a power source of a battery 62 (see FIG. 1) provided outside the housing 12. In FIG. 1, the battery 62 is provided on the front side of the housing 12 (in front of the motor 16).

In FIG. 5, the driving force transmission mechanism 58 includes a first transmission mechanism section 58A coupled to the flap drive source 56, a second transmission mechanism section 58B for converting the moving direction of the driving force from the first transmission mechanism section 58A, a third transmission mechanism section 58C for converting the moving direction of the driving force from the second transmission mechanism section 58B, and a fourth transmission mechanism section 58D for transmitting the driving force from the third transmission mechanism section 58C to the flaps 38.

The first transmission mechanism section 58A transmits the rotary driving force (rotation movement) of the flap drive source 56 as it is, as the rotation movement. Specifically, the first transmission mechanism section 58A includes a drive sprocket 64 fixed to an output shaft 56a of the flap drive source 56, a driven sprocket 66 positioned coaxially with the blade rotational axis a1 in a rotatable manner, and a chain 68 wound around the drive sprocket 64 and the driven sprocket 66.

The driven sprocket 66 is larger than the drive sprocket 64. The driven sprocket 66 is supported by the support cylinder 32b provided for the blade holder 32 through a bearing 65. The driven sprocket 66 is rotatable about the blade rotational axis a1. The driven sprocket 66 has a ring shape, and has an opening. The output shaft 16a of the motor 16 is inserted into the opening of the driven sprocket 66. It should be noted that the first transmission mechanism section 58A may be in the form of a belt transmission mechanism having a pulley and a belt. The first transmission mechanism section 58A may be in the form of a gear mechanism for transmitting the driving force through a plurality of gears.

Figure 6:
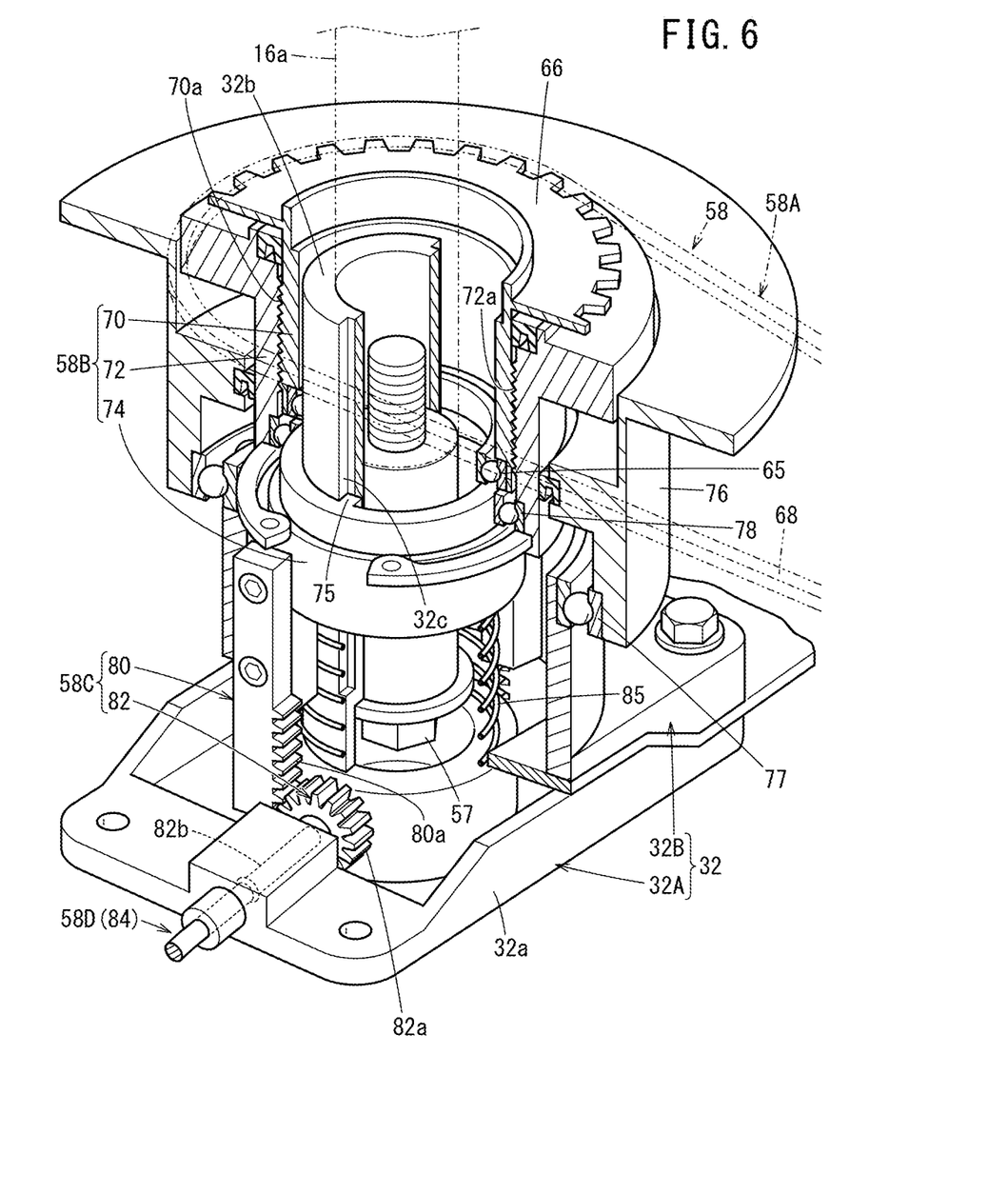
FIG. 6 is a view showing structure of a driving force transmission mechanism and components around the driving force transmission mechanism.

The second transmission mechanism section 58B converts the rotation movement about the blade rotational axis a1 into the movement in the axial direction along the blade rotational axis a1. In FIG. 6, the second transmission mechanism section 58B includes a first screw cylinder 70, a second screw cylinder 72, and a slide cylinder 74. A male screw 70a is formed in the outer circumferential surface of the first screw cylinder 70. A female screw 72a configured to be screw-engaged with the male screw 70a is formed in the inner circumferential surface of the second screw cylinder 72. The slide cylinder 74 is rotatable relative to the second screw cylinder 72, and displaceable along the blade rotational axis a1.

The hollow first screw cylinder 70 is formed coaxially with the driven sprocket 66. The first screw cylinder 70 protrudes downward from the driven sprocket 66. During rotation of the driven sprocket 66, the first screw cylinder 70 rotates together with the driven sprocket 66. The first screw cylinder 70 is formed integrally with the driven sprocket 66. That is, the driven sprocket 66 and the first screw cylinder 70 comprise a single component part. It should be noted that the first screw cylinder 70 may be a separate component part fixed to the driven sprocket 66. The first screw cylinder 70 is supported by the support cylinder 32b through the bearing 65 in a rotatable manner.

For example, the second screw cylinder 72 is slidable along the blade rotation axis a1 by spline structure, and supported by a bearing holder 76 in a nonrotatable manner about the blade rotational axis a1. The second screw cylinder 72 is accommodated inside the bearing holder 76 in a vertically movable manner. The bearing holder 76 is a hollow cylindrical member fixed to the housing 12 in a nonrotatable manner. A bearing 77 is provided between the bearing holder 76 and the blade holder 32 (second holder member 32B). Therefore, the blade holder 32 is supported in a rotatable manner about the blade rotational axis a1.

The slide cylinder 74 is supported by the support cylinder 32b provided for the blade holder 32 in a slidable manner along the blade rotational axis a1, and supported in a relatively nonrotatable manner about the blade rotational axis a1. Therefore, when the blade holder 32 rotates together with the cutter blade 15, the slide cylinder 74 rotates together with the support cylinder 32b about the blade rotational axis a1.

A guide groove 32c is formed in the outer circumferential surface of the support cylinder 32b along the blade rotational axis a1. A protrusion 75 is formed in the inner circumferential surface of the slide cylinder 74, and the projection 75 is inserted into the guide groove 32c. In the structure, though the slide cylinder 74 is slidable along the blade rotational axis a1 relative to the support cylinder 32b, the slide cylinder 74 is not rotatable relative to the support cylinder 32b. A bearing 78 is provided between the second screw cylinder 72 and the slide cylinder 74. In the structure, the slide cylinder 74 is rotatably supported by the second screw cylinder 72 by the bearing 78.

The slide cylinder 74 is elastically biased toward the second screw cylinder 72 by a compression coil spring 85 all the time. Therefore, when the second screw cylinder 72 is lowered, the slide cylinder 74 is pressed downward by the second screw cylinder 72. Thus, the slide cylinder 74 is lowered in opposition to the elastic force of the compression coil spring 85. In contrast, when the second screw cylinder 72 moves upward, the slide cylinder 74 moves upward together with the second screw cylinder 72 by the elastic force of the compression coil spring 85. Therefore, when the second screw cylinder 72 is displaced along the rotational axis a1, the slide cylinder 74 is displaced (moves vertically) in the axial direction together with the second screw cylinder 72.

The third transmission mechanism section 58C converts the movement in the axial direction along the blade rotational axis a1 into rotational movement to rotate the flaps 38. Specifically, the third transmission mechanism section 58C includes a rack member 80 fixed to the slide cylinder 74, and a pinion member 82 provided with a pinion 82a in mesh with teeth 80a of the rack member 80. Two pairs of the rack member 80 and the pinion member 82 are provided symmetrically about the blade rotational axis a1.

The rack member 80 is a rod member extending along the blade rotational axis a1. The teeth 80a are formed in the rack member 80 along the blade rotational axis a1. When the slide cylinder 74 is displaced along the rotational axis a1, the rack member 80 is displaced vertically in the axial direction together with the slide cylinder 74.

An axial part 82b of the pinion member 82 is rotatably supported by both ends of the holder base part 32a of the blade holder 32.

In FIG. 5, the fourth transmission mechanism section 58D is a flexible shaft 84 for transmitting the driving force for operating the flaps 38, to the flaps 38. The flexible shaft 84 is configured to transmit the rotation force inputted to one end 84a to another end 84b which is positioned non-coaxially with the one end 84a. For example, the flexible shaft 84 has structure by combining steel wires that are wound reversely to each other.

The one end 84a of the flexible shaft 84 is coupled and fixed to the axial part 82b of the pinion member 82. The other end 84b of the flexible shaft 84 is coupled to, and fixed to the flaps 38. Specifically, the other end 84b of the flexible shaft 84 is coupled to, and fixed to the inner end of the flap 38 in the radial direction, on the flap pivotal axis a2. The other end 84b is positioned below the one end 84a of the flexible shaft 84. The flexible shaft 84 is provided inside the recess 45 of the blade body 36 (see FIG. 4).

Next, operation of the lawn mower 10 having the above structure will be described.

In FIG. 1, when the cutter blade 15 is rotated under operation of the motor 16, the cutter blade 15 cuts (clips) lawn grass grown on the lawn ground right under the lawn mower 10. The clipped lawn grass (grass clippings) is swirled by the transportation wind (swirl wind) produced by rotation of the cutter blade 15, and transported to the grass clippings container 20 through the grass clippings discharge passage 13 formed in the housing 12.

In this case, the flaps 38 provided for the cutter blade 15 are operated by the flap drive mechanism 54 roughly in the following manner. In FIG. 5, when the output shaft 56a of the flap drive source 56 is rotated, rotation of the output shaft 16a is transmitted to the driven sprocket 66 through the chain 68. When the driven sprocket 66 is rotated, the slide cylinder 74 is displaced in the axial direction together with the second screw cylinder 72 which is in screw engagement with the first screw cylinder 70. When the slide cylinder 74 is displaced in the axial direction, the rack member 80 is displaced in the same direction as the slide cylinder 74, and the pinion member 82 is rotated. When the pinion member 82 is rotated, the flexible shaft 84 is rotated, and the flap angle θ of the flap 38 changes.

In FIG. 5, the flap 38 is placed in a horizontal state (flap angle θ=0°). As an example of the flap drive mechanism 54, operation of increasing the flap angle θ (swinging the flap 38 upward) will be described.

When the output shaft 56a of the flap drive source 56 is rotated in the direction indicated by the arrow A, in the first transmission mechanism section 58A, the rotational driving force of the flap drive source 56 is transmitted to a member provided coaxially with the blade rotational axis a1. Specifically, by rotation of the output shaft 56a of the flap drive source 56 in the direction indicated by the arrow A, the chain 68 wound around the drive sprocket 64 moves in the direction indicated by the arrow B. As a result of movement of the chain 68, the driven sprocket 66 wound around the chain 68 rotates in the direction indicated by an arrow C.

As a result of rotation of the driven sprocket 66, by the second transmission mechanism section 58B, the rotational driving force is converted into the driving force in the axial direction. Specifically, when the first screw cylinder 70 provided for the driven sprocket 66 is rotated in the direction indicated by the arrow C, by screw engagement of the male screw 70a and the female screw 72a, the second screw cylinder 72 moves down as indicated by an arrow D. That is, though rotation of the second screw cylinder 72 is limited by the bearing holder 76, since the second screw cylinder 72 can move in the vertical direction (in the direction along the blade rotational axis a1), the rotational movement of the first screw cylinder 70 is converted into the linear movement by the male screw 70a and the female screw 72a, and the linear movement is transmitted to the second screw cylinder 72.

Then, when the second screw cylinder 72 is lowered, the slide cylinder 74 is lowered as well. In this case, the slide cylinder 74 is rotatable relative to the second screw cylinder 72. Therefore, the slide cylinder 74 rotates together with the support cylinder 32b of the blade holder 32 about the blade rotational axis a1 in the direction indicated by the arrow R.

As a result of the downward movement of the slide cylinder 74, the axial driving force is converted into the rotational driving force by the third transmission mechanism section 58C. Specifically, when the rack member 80 fixed to the slide cylinder 74 is lowered as indicated by an arrow E, the pinion member 82 in mesh with the rack member 80 is rotated in a direction indicated by an arrow F.

As a result of rotation of the pinion member 82, the rotational driving force is transmitted to the flap 38 by the fourth transmission mechanism section 58D. Specifically, the flexible shaft 84 coupled to the pinion member 82 is rotated in the direction indicated by the arrow G. Thus, rotation of the pinion member 82 is transmitted to the flap 38. The flap 38 is rotated about the flap pivotal axis a2 in the direction indicated by an arrow H. As a result, as denoted by an imaginary line in FIG. 5, the flap 38 swings upward.

The magnitude of the flap angle θ corresponds to the amount of downward displacement from the initial position of the second screw cylinder 72 (position of the second screw cylinder 72 when the flap angle θ=0°) which moves in the axial direction as a result of rotation of the first screw cylinder 70. When the cutter blade 15 is rotated in the state where the flap angle θ is larger than 0°, the flap 38 produces an upward air flow.

The flap angle θ of the flap 38 is controlled by the control unit 60, e.g., in correspondence with the operating condition of the lawn mower 10. In this case, the flap angle θ is detected by a flap angle detection sensor (not shown), and the control unit 60 receives the detected flap angle θ as a feedback signal to control the flap drive source 56. For example, the flap angle detection sensor may detect the position of the second screw cylinder 72, the slide cylinder 74, or the rack member 80, and the control unit 60 may detect the flap angle θ based on the detected position indirectly. The flap angle detection sensor may detect the position in the rotation direction of the pinion member 82, the flexible shaft 84, or the flap 38 itself. The flap angle detection sensor may be a rotary encoder provided for the flap drive source 56.

For example, the control unit 60 may control the flap drive source 56 in a manner that the flap angle θ is increased in correspondence with the increase in the lawn mowing load. Alternatively, the control unit 60 may control the flap drive source 56 in a manner to adjust the flap angle θ of the motor 16 based on parameters (weight, weight change amount, internal pressure changes, etc.) regarding the grass clippings container 20. Alternatively, the control unit 60 may control the flap drive source 56 in a manner to adjust the flap angle θ in correspondence with the types of the operation modes (bagging mode, mulching mode) of the lawn mower 10.

In this case, the lawn mower 10 according to the embodiment of the present invention offers the following advantages.

The lawn mower 10 includes the cutter blade 15 having the changeable flap angle θ of the flaps 38 and the flap drive mechanism 54 for driving the flaps 38. Therefore, the flap angle θ of the flaps 38 can be determined to have an optimum angle in correspondence with the operating condition of the lawn mower 10. Accordingly, in correspondence with the operating condition of the lawn mowing operation, it is possible to efficiently produce the transportation wind by the flaps 38.

That is, by inclining the flaps 38 upward to orient the lawn grass growing on the lawn ground to stand upright by the upward air flow, it is possible to cut (clip) the lawn grass by the cutter blade 15 efficiently. Further, after the lawn grass (grass clippings) cut by the cutter blade 15 is lifted upward, and swirled in the housing 12 by the transportation wind, i.e., the upward air flow and the swirl air flow generated by the flaps 38, the lawn grass can be transported into the grass clippings container 20 efficiently.

In the structure, it is possible to efficiently swirl the grass clippings by the transportation wind in the housing 12, and transport the grass clippings to the grass clippings container 20 (FIG. 1) efficiently. Further, when the load is small, e.g., when the cutter blade 15 is in the idling state, and no lawn mowing operation is performed, it is possible to reduce the noises such as wind noises by reducing the flap angle θ of the flaps 38.

In the lawn mower 10, as shown in FIG. 4, the flap pivotal axis a2 does not intersect with the blade rotational axis a1, and the flap pivotal axis a2 is provided at a position offset from the line L which is perpendicular to the blade rotational axis a1 and in parallel to the pivotal axis, in the rotation direction of the cutter blade 15. Therefore, in comparison with the structure where the flap pivotal axis a2 is perpendicular to the blade rotational axis a1, it is possible to place the pivotal axis of the flap 38 at a position closer to the blade front edge. Thus, it becomes possible to prevent the increase in the size of the cutter blade 15, and produce the transportation wind efficiently.

The flap drive mechanism 54 includes the flexible shaft 84 provided along the blade body 36. The flexible shaft 84 transmits the driving force for operating the flaps 38, to the flaps 38. In this manner, it is possible to realize a mechanism for transmitting the driving force to the flaps 38 having the flap pivotal axis a2 which does not intersect with the blade rotational axis a1, by a simple structure.

The expansion 44 is provided for the blade body 36 in an area extending over the cutter blade 15 in the radial direction. The expansion 44 is expanded in the thickness direction of the cutter blade 15. In the surface of the blade body 36 opposite to the surface where the expansion 44 is provided (lower surface in the embodiment), the recess 45 forming the back surface of the expansion 44 is provided. Further, the flexible shaft 84 is provided in the recess 45.

In the structure, since the expansion 44 is provided, it is possible to improve the rigidity of the blade body 36, and since the flexible shaft 84 is provided in the recess 45, it becomes possible to reduce the air resistance during rotation of the cutter blade 15. By improving the rigidity of the blade body 36, variation in the height of the blade edge 34 during rotation is suppressed. Therefore, it becomes possible to improve the finishing appearance after clipping the lawn grass. Since the air resistance during rotation of the cutter blade 15 is reduced, it is possible to reduce the noises such as wind noises.

The blade body 36 includes the inner blade forming part 42a adjacent to the blade central part (central proximal part 40), and the outer blade forming part 42b provided outside the inner blade forming part 42a in the radial direction. The flaps 38 are attached to the outer blade forming part 42b. The outer blade forming part 42b is provided below the inner blade forming part 42a. The one end 84a of the flexible shaft 84 is provided in the inner blade forming part 42a, and the other end 84b of the flexible shaft 84 is provided in the outer blade forming part 42b. Accordingly, also in the case of adopting the blade body 36 where the outer blade forming part 42b is positioned below the inner blade forming part 42a, with the simple structure, it is possible to efficiently transmit the rotational driving force for changing the flap angle θ to the flaps 38.

The present invention is not limited to the above described embodiment. Various modifications can be made without deviating from the gist of the present invention.

What is claimed is:

1. A lawn mower comprising:
a cutter blade including a blade body and a flap, the blade body extending in a direction perpendicular to a blade rotational axis and including a blade edge in a front edge in a rotation direction, the flap having a changeable flap angle, and being attached to the blade body; and
a flap drive mechanism configured to drive the flap,
wherein the blade body has a shape with a sweepback angle inclined in a reverse-rotation direction of the cutter blade with respect to a radiation direction around the blade rotational axis,
a pivotal axis of the flap is provided along the blade edge without intersecting with the blade rotational axis, and
the pivotal axis is provided at a position offset from a line perpendicular to the blade rotational axis and in parallel to the pivotal axis, in a rotation direction of the cutter blade,
wherein the flap drive mechanism includes a flexible shaft provided along the blade body, and configured to transmit a driving force for operating the flap, to the flap.

2. The lawn mower according to claim 1, wherein an expansion is provided for the blade body, over an area extending in a radial direction of the cutter blade, the expansion expanding in a thickness direction of the cutter blade,
a recess is provided on a surface of the blade body opposite to a surface where the expansion is provided, the recess forming a back surface of the expansion, and
the flexible shaft is provided in the recess.

3. The lawn mower according to claim 1, wherein the blade body includes an inner blade forming part adjacent to a blade central part and an outer blade forming part provided outside the inner blade forming part in a radial direction, and the flap is attached to the outer blade forming part,
the outer blade forming part is positioned below the inner blade forming part, and
one end of the flexible shaft is provided in the inner blade forming part, and another end of the flexible shaft is provided in the outer blade forming part.

4. A lawn mower comprising:
a cutter blade including a blade body and a flap, the blade body extending in a direction perpendicular to a blade rotational axis and including a blade edge in a front edge in a rotation direction, the flap having a changeable flap angle, and being attached to the blade body; and a flap drive mechanism configured to drive the flap,
wherein the blade body has a shape with a sweepback angle inclined in a reverse-rotation direction of the cutter blade with respect to a radiation direction around the blade rotational axis,
a pivotal axis of the flap is provided along the blade edge without intersecting with the blade rotational axis, and
the pivotal axis is provided at a position offset from a line perpendicular to the blade rotational axis and in parallel to the pivotal axis, in a rotation direction of the cutter blade that is opposite to the reverse-rotation direction, and
the pivotal axis is provided between the blade edge and the line.

* * * * *